United States Patent [19]

Solaas

[11] Patent Number: 5,209,855
[45] Date of Patent: May 11, 1993

[54] CONTINUOUS ACID WASHING OF POLYMER RESIN WITH CONTROLLED METERING OF ACID

[75] Inventor: Dale M. Solaas; Donald E. Cummins; Glenn F. Kile, all of Borger; George W. Long, Fritch, all of Tex.

[73] Assignee: Phillips Petroleum Company, Bartlesville, Okla.

[21] Appl. No.: 805,405

[22] Filed: Dec. 10, 1991

[51] Int. Cl.⁵ ................ B01D 17/12; C08F 283/00
[52] U.S. Cl. ................ 210/743; 210/87;
210/93; 210/96.1; 210/143; 210/182; 210/202;
210/259; 210/769; 210/770; 210/772; 210/774;
210/806; 364/502; 422/62; 422/110; 422/135;
422/138; 436/55; 525/537; 528/486
[58] Field of Search ........... 210/87, 96.1, 143, 198.1,
210/200–203, 743, 806, 93, 182, 259, 260, 758,
774, 769, 770, 772; 422/62, 110, 111, 131, 135,
138; 526/280; 364/500, 502; 585/501, 701, 955,
956; 436/55; 528/388, 486; 525/537

[56] References Cited

U.S. PATENT DOCUMENTS

| | | | |
|---|---|---|---|
| 3,354,129 | 11/1967 | Edmonds et al. | 526/280 |
| 3,605,775 | 9/1971 | Zaander et al. | 364/502 |
| 3,791,793 | 2/1974 | Friedmann et al. | 422/62 |
| 3,839,301 | 10/1974 | Scoggins | 260/79 |
| 3,899,294 | 8/1975 | Magiros | 23/230 A |
| 4,053,743 | 10/1977 | Niemi | 364/500 |
| 4,219,419 | 8/1980 | Sweeny | 210/96. |
| 4,239,493 | 12/1980 | Niemi et al. | 364/.00 |
| 4,373,091 | 2/1983 | Edmonds, Jr. | 528/481 |
| 4,728,723 | 3/1988 | Nakamura et al. | 528/486 |
| 4,801,664 | 1/1989 | Nesheiwat et al. | 525/537 |
| 4,857,158 | 8/1989 | Cawlfield | 204/92 |
| 4,877,850 | 10/1989 | Geibel et al. | 528/388 |
| 4,940,551 | 7/1990 | Riggs et al. | 210/743 |

Primary Examiner—Joseph W. Drodge
Attorney, Agent, or Firm—George E. Bogatie

[57] ABSTRACT

A batch type process for purification of a polymer resin, in which a predetermined volume of acid is rapidly emptied and stirred into a fixed volume of polymer slurry for chemically treating impurities in the slurry, is converted to a continuous operation by supplying a substantially constant stream of polymer slurry and a controlled stream of acid to a mixing vessel. pH control of the polymer slurry required for effective purification of the polymer resin is achieved by manipulating the flow rate of the acid stream responsive to a feedforward control signal which operates in conjunction with a feedback signal. The feedforward signal is based on an upstream measurement of slurry flow rate to the mixing vessel and the feedback signal is based on a downstream pH measurement of slurry flowing from the mixing vessel.

14 Claims, 1 Drawing Sheet

CONTINUOUS ACID WASHING OF POLYMER RESIN WITH CONTROLLED METERING OF ACID

This invention relates to production of polymer resin. In one aspect, it relates to a method for acid washing of polymer resin which is produced in a batch reactor. In another aspect, it relates to a method and apparatus for carrying out a continuous acid washing step for treating polymer resin.

BACKGROUND OF THE INVENTION

The production of arylene sulfide polymers by the reaction of at least one polyhalo-substituted cyclic compound with an alkali metal sulfide in a reaction medium comprising a polar organic compound is disclosed in U.S. Pat. No. 3,354,129, issued to Edmonds and Hill. The disclosure of this Edmonds and Hill patent is herein incorporated by reference.

The poly(arylene) sulfide, hereinafter PAS, of most industrial importance is a semi-crystalline poly(phenylene) sulfide polymer, hereinafter PPS, which is produced commercially from a sodium sulfide equivalent, e.g., an approximately equal mixture of sodium hydrosulfide (NaSH) and sodium hydroxide (NaOH) followed by the addition of p-dichlorobenzene (DCB), in a reaction medium of a cyclic amide, such as N-methyl-2-pyrrolidone (NMP).

It is well known that properties and also processing characteristics of PAS polymer, such as PPS, can be improved by treating the polymers obtained directly from the reactor with a variety of fluid treating agents, which can be selected from the group including metal salts derived from the elements of Periodic Groups IA, II and IIIA, organic acids, and inorganic basic compounds. Specific treating agents include lithium acetate, sodium carbonate, potassium bicaronate, sodium bicarbonate, barium acetate, calcium acetate, sodium acetate, magnesium propionate, zinc nitrate, aluminum acetate, glacial acetic acid, concentrated ammonium hydroxide (30%), sodium hydroxide and the like. A particularly preferred compound because of special efficacy in the process is sodium acetate. The thus modified polymer is known to exhibit improved physical properties, as well as improved processing characteristics.

Further, it is known that impurities present in PAS polymers can be chemically treated in a manner such that the PAS polymers are essentially freed of ash forming material, which includes ions from the salts (e.g., $Na^+$ ions), and concurrently cured to a higher molecular weight product exhibiting reduced melt flow. The chemical treating agents for this further treatment are water soluble and can be selected from hydrogen peroxide, an alkali metal or alkaline earth metal hypochlorides, sulfur acids, sulfonyl halides, chlorine, nitrogen dioxide, chromium trioxide, alkali metal permanganates, acetic acid and nitric acid. A particularly preferred compound because of its special efficiency is acetic acid.

The acetic acid treatment for purifying a modified or unmodified PPS resin, which is essentially a washing operation, includes contacting a resin with an aqueous acidic solution to form a slurry, wherein a pH in a range of about 5 to about 6 is desired for the slurry. The acidic solution, which is contacted with PPS polymer for washing, needs to have a pH and acid content sufficient to extract the salt or ash ions from the polymer. For the acidic solution washing, the PPS resin is preferably slurried with condensed or deionized water and acetic acid in an amount of about 0.05 volume-%, (based on the volume of the polymer slurry) is added to obtain the desired pH for the slurry. Accordingly, the acid washing operation is carried out in a batch fashion, so that the proper amount of acid can be added to a fixed volume of polymer slurry. In the past, this acetic acid has been manually added to a wash vessel containing the polymer slurry.

The amount of acid added to the polymer slurry is critical, since too little acid fails to remove the impurities ions and too much acid adversely affects many desirable properties of the resin.

Accordingly, it is an object of this invention to improve control of the amount of acid added to a polymer slurry for removing impurity ions.

It is a further object of this invention to increase resin throughput in an acid washing operation.

It is a still further object of this invention to provide a continuous acid treatment washing operation for purifying a polymer resin.

Other objects and aspects, as well as the advantages of this invention will be apparent to those skilled in the art upon reading the specification and the appended claims.

SUMMARY OF THE INVENTION

A batch-type acid washing operation is disclosed for the purification of a polymer resin, which contains by-product impurities including ions of a salt. In this operation, a batch of polymer slurry is passed in a slurry feed stream to a liquid-solids filter and a filtered batch of polymer solids is passed from the filter to an acid wash vessel where a known volume of solids is accumulated and reslurried in the wash vessel. Then a predetermined volume of acid is emptied into the wash vessel while stirring the known volume of polymer slurry so as to adjust the pH of the slurry to a value not higher than 6 pH units. The pH adjusted slurry is withdrawn from the wash vessel in an effluent stream for further processing. In accordance with the present invention, the acid washing operation is significantly improved by continuously delivering polymer slurry to the wash vessel and concurrently adding acid via an acid delivery stream for continuous treatment of the slurry, wherein the flow rate of the acid delivery stream is responsive to a pH control system. The pH control system combines a flow ratio signal representative of a desired ratio of slurry to acid, and a pH feedback control signal to determine a combined signal for automatically manipulating flow rate of the stream delivering acid to the slurry vessel, so as to maintain a desired pH for the effluent slurry stream of the wash vessel.

DETAILED DESCRIPTION OF THE PREFERRED EMBODIMENT

Figure 1:
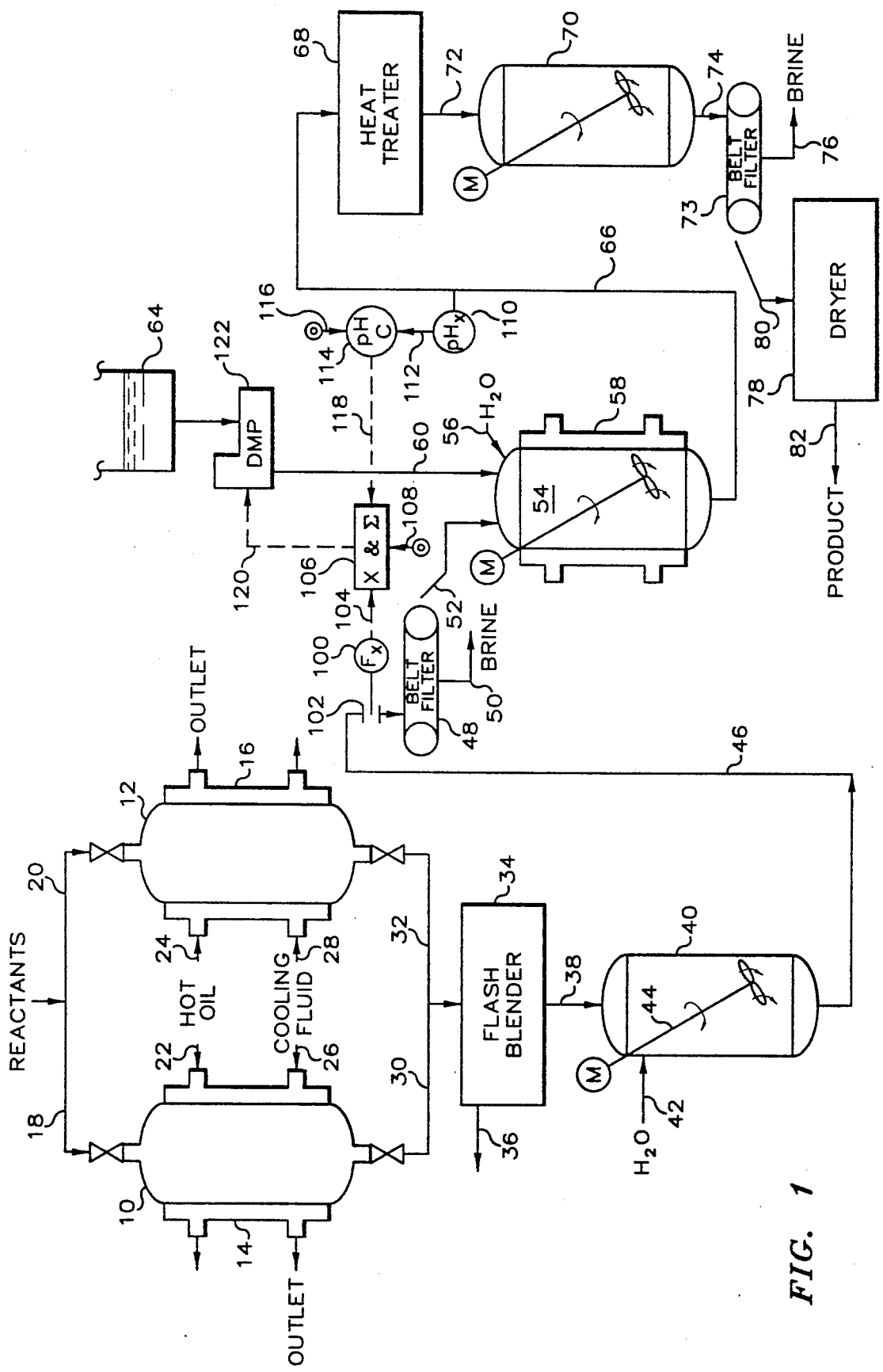
FIG. 1 is a schematic illustration of a polymer recovery process and the associated pH control system of the present invention.

The invention is described as applied to a process for preparing PAS polymer by reacting at least one polyhalo-substituted cyclic compound having unsaturation between the adjacent ring atoms, with an alkaline metal sulfide in a reaction medium comprising a polar organic compound, which reaction results in a polymer containing a series of alternating aromatic rings and sulfur atoms.

When treating a PAS resin by washing with an acidic component for removal of impurity ions according to this invention, the maximum amount of acid used will depend upon the oxidative strength of the acid. Accordingly, the maximum amount of acid having strong oxidative characteristics which can be used in treating a PAS resin will be less than the maximum amount of an acid having weak oxidative characteristics. This maximum amount can be readily determined by one skilled in the art.

Further, when treating a PAS resin in accordance with this invention, the treating is carried out at an elevated temperature which does not exceed the melting point of the resin. Generally, a temperature between 70° and 200° F. and at atmospheric pressure is effective. The concentration of the PAS resin in the polymer slurry to which the acid is added is such that the acetic acid sufficiently contacts the polymer resin. Generally, the concentration of the PAS resin in the polymer slurry ranges from about 1 weight percent to about 50 weight percent, and preferably from about 5 weight percent to about 40 weight percent.

The acid washing operation according to this invention can be used to treat the resin at any point in the process after the resin has been formed in the polymerization reactor, but before the resin has been subjected to any oxidative curing process. In commercial applications, it is preferable to treat the PAS resin during the initial recovery process.

Control of the pH of the effluent slurry stream from an acid washing operation is achieved according to this invention by manipulating the addition rate of a reagent while stirring the polymer slurry.

Simple feedback pH control systems which manipulate reagent addition for controlling the pH of effluent from a vessel have not been satisfactory for pH control, due for one reason to the extreme non-linearity of the titration curve. Further problems arise in simple pH feedback control if the reagent is added but its effect has not been seen by the pH electrode when pH measurement and set point are equal, then too much reagent will be added. The present invention, however, combines a slurry feed flow rate signal with a pH feedback control signal for effectively adding the required amount of acid to the polymer slurry, as will be explained more fully hereinafter.

To demonstrate the improved acid washing operation of this invention, a polymerization process illustrating recovery and purification of a PAS resin is described below. Referring now to FIG. 1, there is illustrated a pair of batch reactors 10 and 12, having jackets 14 and 16, respectively. As has been previously stated, at least one polyhalo-substituted cyclic compound is reacted with an alkaline metal sulfide in a reaction medium of a polar organic compound at an elevated temperature in reactors 10 and 12. Reactants are charged to the reactors 10 and 12 via conduits 18 and 20, respectively. A heating fluid such as hot oil is fed to the jackets to bring the reaction mass up to a desired temperature, via conduits 22 and 24 respectively, and then cooling fluid is added to the jackets 14 and 16 via conduits 26 and 28 respectively, to remove the exothermic heat of reaction and to make the reaction temperature follow a prescribed temperature-time curve. There is generally an optimum temperature profile depending upon the specific growth rates of the polymer step growth reactions.

After dehydration of the reaction mass, reaction effluent is withdrawn in turn from reactors 10 and 12 via conduits 30 and 32, respectively. Generally, a time period of about 1 hour can be utilized between turns for withdrawing reaction effluent. Reactor effluent is provided to a flash blender vessel 34. The reaction effluent will generally comprise PAS resin, the polar organic compound, by-product alkali metal halide and reaction impurities. The flashed polar compound is removed as a vapor from the flash blender vessel 34 through conduit 36, and solids are removed from the vessel 34 via conduit 38 and passed to dilution vessel 40. Water is added via conduit 42 in sufficient quantity to dissolve a major portion of the water soluble salts in the polymer. The slurry thus formed in dilution vessel 40 is stirred by the stirrer 44. The slurry effluent from dilution vessel 40 is passed through conduit 46 to a belt filter 48, which is a liquid-solids filter for removing water from a slurry. A major portion of the salt contained in the slurry is removed from the polymer resin via a brine stream in flowing conduit 50 from belt filter 48.

The solids, which are separated from the slurry, form as a "filter cake" on the belt filter and are passed to a stirred wash vessel 54, via conduit 52. It is in vessel 54 that the acid is added to the stirred polymer slurry in accordance with this invention. The polymer resin is reslurried in vessel 54 by preferably adding condensed or deionized water via conduit 56. While stirring, the polymer is heated by any suitable means such as a heating fluid, e.g., which is fed to the jacket 58 of wash vessel 54. Acetic acid stored in a vessel 64 is added to the wash vessel 54 via conduit 60 by a diaphragm metering pump 122. The pH adjusted slurry is removed from wash vessel 54 via conduit 66 and passed to heat treater 68. The heat treater 68 is a pressurized heat exchanger where the slurry is heated to a temperature above its normal boiling point. This heat treatment further reduces trace impurities in the slurry. Resin slurry withdrawn from heat treater 68 is passed to a feed vessel 70 via conduit 72, and then passed to belt filter 73 via conduit 74, wherein brine is removed via conduit 76, and filter cake is passed to dryer 78 via conduit 80. Accordingly, dry purified resin is withdrawn via conduit 82.

The reaction and recovery process described to this point for the production of PAS resin is conventional. It is the manner in which the acid washing operation is controlled, so as to permit a continuous washing operation and to substantially maximize the production rate of the polymer resin, which provides the novel features of the present invention.

A specific pH control system configuration is set forth in FIG. 1 for the sake of illustration, however, the invention extends to different types of control system configurations which accomplish the purpose of the invention. Dash lines designating signal lines in the drawing are electrical or pneumatic in this preferred embodiment.

The invention is also applicable to mechanical, hydraulic or other signal means for transmitting information. In almost all control systems, some combination of electrical, pneumatic, mechanical or hydraulic signals will be used, however, use of any other type of signal transmission compatible with the process and equipment in use is within the scope of this invention.

The controller shown may utilize the various modes of control, such as proportional-integral-derivative. Any controller capable of accepting two input signals and producing a scaled output signal, representative of a comparison of the two input signals, is within the scope of this invention.

The scaling of an output signal by controller is well known in control systems art. Essentially, the output of a controller may be scaled to represent any desired factor or variable. An example of this is where a desired flow rate and an actual flow rate are compared by a controller. The output signal could be a signal representative of a desired change in the flow rate of some fluid necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5 volts corresponds to 50 percent, some specified flow rate, or some specified temperature.

The various transducing means used to measure parameters which characterize the process and the various signals generated may take a variety of forms or formats. For example, a controller elements of the system can be implemented using electrical analog, digital electronic, pneumatic, hydraulic, mechanical or other similar types of equipment or combinations of one or more such types of equipment. While the presently preferred embodiment of the invention utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to a square of the actual flow rate. Other measuring instruments might produce a signal which is proportional to the measured parameter, and still other transducing means may produce a signal which bears a more complicated, but known relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring again now to FIG. 1, flow transducer 100, in combination with a flow sensor 102, which is operably located in conduit 46, provides an output signal 104, which is representative of the flow rate of slurry in conduit 46. Signal 104 is provided as a first input to a computing device 106 which provides summation and multiplication that cause the output signal 120 to follow an equation of the form $Ax + By + C$ where the coefficients A and B are multiplied by process variables 104 and 118 respectively. Coefficients A, B and C are introduced manually as illustrated by signal 108.

The coefficients A, B and C are typically entered by a process engineer and only changed when required by changes in process conditions such as changes in feedstock, etc. The coefficient A, which multiplies the slurry feed signal 104 in computing device 106, is representative of the desired ratio of polymer slurry flowing through conduit 46 and the flow rate of acid flowing through conduit 60. Initial estimates will generally be made for the coefficients A, B and C and the most useful values for these coefficients will be based on operating experience. Examples of coefficients successfully used for a commercial installation producing a specific type polymer resin are as follows: $A=2$, $B=1.2$ and $C=-30$.

A pH transducer 110 in combination with a sensor, such as pH sensing element, which is operably located in conduit 66, provides an output signal 112, which is representative of the actual pH of the polymer slurry flowing in conduit 66. Signal 112 is provided as the process variable input to pH controller 114. Signal 116, which is a set point signal for pH controller 114, is representative of the desired pH of the slurry flowing in conduit 66.

In response to signals 112 and 116, the controller 114 provides an output signal 118, which is responsive to the difference between signals 112 and 116. Signal 118 is scaled so as to be representative of the flow rate of acid flowing in conduit 60, required to maintain the actual pH of the polymer slurry flowing in conduit 66 equal to the desired pH represented by set point signal 116. Signal 118 is provided as a second process input to the computing device 106.

Signals 104 and 118 are multiplied respectively by coefficient A and B in computing device 106, and the output signal 120 follows the equation A (signal 104) + B (signal 118) + C. Signal 120 is provided from computing device 106 as a control signal input to diaphragm metering pump 122, and the acid flow through conduit 60 is adjusted by changing the length and number of strokes of the pump 122 responsive to control signal 120.

In operation, the pH control system of this invention combines a feedforward flow ratio control and pH feedback control to effectively add the proper quantity of acid from storage vessel 64 to the stirred polymer slurry contained in wash vessel 54.

The flow ratio feature of this pH control scheme relies on the coefficient A which multiplies the slurry feed flow signal 104 and thus encompasses a feedforward scheme under which changes in slurry feed flow are detected and corrections to the acid flow are made without waiting for a change in pH in the effluent stream to be detected. Since signal 120 causes the volume of acid added to the wash vessel 54 to be a direct ratio of the flow rate of slurry in conduit 46, an increase in slurry flow automatically increases acid flow and vice versa. As previously stated, the maximum amount of acid that can be added to the slurry depends on the strength of the acid so that a greater quantity of a mild acid would be required compared to a strong acid. The pH feedback of the control scheme relies on coefficient B which multiplies signal 118. The pH feedback feature effectively provides on-line adjustment to compensate for errors in the feedforward scheme such as errors which may occur, e.g., in slurry flow measurement, changes in reagent concentration, accuracy of coefficient A, etc. The combined flow ratio and pH feedback control scheme according to this invention has been found to be extremely effective for a polymer washing operation.

For reasons of brevity, conventional auxiliary equipment, such as additional pumps, heat exchangers, additional measurement control devices, and additional process equipment, which would be required in the commercial operation, have not been included in the above description, as they play no part in the explanation of the invention.

Specific control components used in the practice of this invention, as illustrated in FIG. 1, such as flow transducer 100, flow sensor 102, pH transducer 110, PID controller 114, metering pump 122, and computing device 106, are each well known commercially available control components such as are described at length in *Perry's Chemical Engineers Handbook*, 6th Edition, Chapter 22, McGraw-Hill. Further, the belt filter illustrated at 48 and 72 in FIG. 1, which is a commercially available unit for removing liquid from a slurry by using continuous vacuum techniques, is described in Chapter 19 in the aforementioned edition of *Perry's Chemical Engineers Handbook*.

In summary, the pH control system of the present invention in acting to maintain a desired pH for the effluent of the polymer wash vessel, permits improved production rate of the polymer resin, as well as improved purity of the resin produced.

While the invention has been described in terms of the presently preferred embodiment, reasonable variations and modifications are possible by those skilled in the art and such variations and modifications are within the scope of the described invention.

That which is claimed is:

1. In a batch-type method for acid washing a polymer resin for purification of the resin, wherein:
   a batch of polymer slurry is passed in a slurry feed stream to a continuous liquid-solids filter and the filtered batch of polymer solids is passed to an acid wash vessel for accumulating a known volume of solids in said acid wash vessel;
   said known volume of solids is reslurried and stirred in said wash vessel;
   a predetermined volume of acid is rapidly emptied into said wash vessel while stirring for adjusting the pH of the slurry to a value no higher than 6 pH units; and
   the adjusted pH slurry is withdrawn from said wash vessel in a slurry effluent stream for further processing;
   the improvement comprises:
   (a) continuously delivering said polymer solids to and slurrying said polymer solids in said wash vessel;
   (b) providing an acid delivery stream having a metering pump operably located therein for injecting a controlled amount of acid to the polymer slurry in said wash vessel;
   (c) manipulating the flow rate of acid in said acid delivery stream responsive to a pH control signal by:
      (aa) establishing a first signal representative of the actual flow rate of said slurry feed stream;
      (bb) establishing a second signal representative of the actual pH of slurry flowing in said slurry effluent stream;
      (cc) establishing a third signal representative of a desired pH value for said slurry effluent stream;
      (dd) establishing a pH feedback signal responsive to the difference between said second signal and said third signal wherein said pH feedback signal is scaled so as to be representative of the flow rate of said acid delivery stream required to maintain the actual pH value of said slurry effluent stream represented by said second signal substantially equal to the desired pH value represented by said third signal;
      (ee) multiplying said first signal by a flow ratio coefficient which is representative of a desired flow ratio between said slurry feed stream and said acid delivery stream to form a flow ratio signal, and combining said flow ratio signal and said pH feedback signal to establish said pH control signal; and
      (ff) manipulating the flow rate of acid in said acid delivery stream responsive to said control signal.

2. A method in accordance with claim 1, wherein said pH control signal follows an equation of the form $Ax+By+C$ wherein:
   A, B and C are operator entered costants
   $x$ = flow rate of slurry feed, and
   $y$ = pH feedback signal.

3. A method in accordance with claim 1 wherein said batch of polymer slurry is recovered from a polymerization reaction effluent comprising poly(arylene sulfide) resin, a polar organic compound and by-product impurities, which impurities include ions of a salt.

4. A method in accordance with claim 3, wherein said poly(arylene sulfide) is poly(phenylene sulfide).

5. A method in accordance with claim 1 wherein the pH of said slurry effluent stream is maintained between a value of about 3 to about 6 pH units by the addition of an organic acid.

6. A method in accordance with claim 5, wherein said organic acid is acetic acid.

7. A method in accordance with claim 1 wherein the pH adjusted slurry is subjected to heat treating, reslurrying and filtering in a liquid-solids filter drying to produce purified polymer resins.

8. A method in accordance with claim 1, wherein said steps performed in said wash vessel including accumulating of solids, re-slurrying, stirring and adding of acid to the slurry are carried out at a temperature in a range from about 70° to about 200° F.

9. A method in accordance with claim 1 wherein said known volume of solids in said wash vessel is slurried with condensed water.

10. A method in accordance with claim 1 wherein said known volume of solids in said wash vessel is slurried with deionized water.

11. Apparatus for purification of a polymer resin comprising:
   (a) a dilution vessel arranged for forming a polymer slurry feed stream containing poly(arylene sulfide) resin and by-product reaction impurities including ions of a salt;
   (b) first conduit means for withdrawing a slurry feed stream from said dilution vessel;
   (c) a liquid-solids filter arranged for receiving said withdrawn slurry feed stream and recovering polymer resin from said slurry feed stream;
   (d) an acid wash vessel equipped with (aa) second conduit means for continuously receiving said polymer resin from said liquid solids filter;

(bb) means for forming a polymer slurry in said acid wash vessel, and means for stirring said polymer slurry;

(cc) third conduit means having a metering pump operably located therein for continuously adding a controlled flow of acid to said polymer slurry in said wash vessel for adjusting the pH of the polymer slurry to a pH value no higher than 6 pH units; and (dd) fourth conduit means for withdrawing a pH adjusted slurry stream from said wash vessel for further processing;

(e) a pH control system for manipulating the flow rate of acid in said third conduit means, said pH control system comprising:

(aa) means for establishing a first signal representative of the actual flow rate of slurry in said first conduit means;

(bb) means for establishing a second signal representative of the actual flow rate of slurry in said fourth conduit means;

(cc) means for establishing a third signal representative of a desire pH value for the slurry withdrawn in said fourth conduit means;

(dd) means for establishing a pH feedback signal responsive to the difference between said second signal and said third signal, wherein said pH feedback signal is scaled so as to be representative of the flow rate of acid in said third conduit means required to maintain the actual pH value of slurry flowing in said fourth conduit means represented by said second signal substantially equal to the desired pH value represented by said third signal; and (ee) a computing unit for multiplying said first signal by a flow ratio coefficient which is representative of a desired flow ratio between slurry flow in said first conduit means and acid flow in said third conduit means to form a flow ratio signal, and combining said flow ratio signal and said pH feedback signal for establishing a control signal for manipulating the flow rate of acid in said third conduit means.

12. Apparatus in accordance with claim 11, additionally comprising a polymerization reactor and wherein said polymer resin is recovered from a polymerization reaction effluent and comprises poly(arylene sulfide) resin, a polar organic compound and by-product impurities.

13. Apparatus in accordance with claim 12, wherein said poly(arylene sulfide) is poly(phenylene sulfide).

14. Apparatus in accordance with claim 12 wherein said acid wash vessel is operated in a temperature range of from about 70° to about 200° F.

* * * * *